(12) United States Patent
Hayashi et al.

(10) Patent No.: US 11,687,255 B2
(45) Date of Patent: Jun. 27, 2023

(54) INFORMATION PROCESSING SYSTEM AND INFORMATION PROCESSING METHOD

(71) Applicant: FUJITSU LIMITED, Kawasaki (JP)

(72) Inventors: Erika Hayashi, Yokohama (JP); Hiroki Ohtsuji, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/483,855

(22) Filed: Sep. 24, 2021

(65) Prior Publication Data

US 2022/0221995 A1 Jul. 14, 2022

(30) Foreign Application Priority Data

Jan. 8, 2021 (JP) .................. 2021-002266

(51) Int. Cl.
*G06F 3/06* (2006.01)
*G06F 12/0802* (2016.01)
*G06F 12/0871* (2016.01)

(52) U.S. Cl.
CPC .......... *G06F 3/0626* (2013.01); *G06F 3/0611* (2013.01); *G06F 3/0631* (2013.01); *G06F 3/0655* (2013.01); *G06F 3/0673* (2013.01); *G06F 12/0802* (2013.01); *G06F 12/0871* (2013.01); *G06F 2212/604* (2013.01)

(58) Field of Classification Search
None
See application file for complete search history.

(56) References Cited

U.S. PATENT DOCUMENTS

| 10,152,339 | B1 * | 12/2018 | Dong .................... G06F 11/261 |
| 2005/0080810 | A1 | 4/2005 | Matsuura |
| 2005/0267891 | A1 | 12/2005 | Shimizu |

FOREIGN PATENT DOCUMENTS

| JP | 2005-115438 A | 4/2005 |
| JP | 2005-327138 A | 11/2005 |
| WO | 2018/189847 A1 | 10/2018 |

* cited by examiner

*Primary Examiner* — Charles J Choi
(74) *Attorney, Agent, or Firm* — Fujitsu Patent Center

(57) ABSTRACT

An information processing system includes: an information processing apparatus; and a terminal apparatus, wherein the terminal apparatus includes a first processor configured to measure response times for respective volumes in the information processing apparatus, and the information processing apparatus includes a second processor configured to reduce a capacity of an allocated cache memory in accordance with the response times.

5 Claims, 26 Drawing Sheets

~2142

| SERVER | CACHE MISS (A) | CACHE HIT (B) | A-B |
|--------|----------------|----------------|--------|
| #0 | 150μ | 30μ | 120μs |
| #1 | 150μ | 60μ | 90μs |
| #2 | 210μ | 60μ | 150μs |
| #3 | 240μ | 30μ | 210μs |
| #4 | 240μ | 210μ | 30μs |
| #5 | 180μ | 90μ | 90μs |

A: CACHE MISS (TOTAL OF THREE TIMES)
B: CACHE HIT (TOTAL OF THREE TIMES)

FIG. 12

| VARIABLE DEFINED IN AVANCE | THRESHOLD |
|---|---|
| M (PERCENTAGE BY WHICH CACHE IS TO BE REDUCED) | 2% |
| T (LOWER LIMIT VALUE OF RESPONSE TIME FOR REDUCING CACHE CAPACITY) | 20 μs |
| N (TIME INTERVAL AT WHICH CACHE EFFECT MEASUREMENT IS PERFORMED) | 5 s |
| I (FIRST REFERENCE VALUE OF I/O OCCURRENCE COUNT) | 2000 TIMES |
| J (SECOND REFERENCE VALUE OF I/O OCCURRENCE COUNT) | 50 TIMES |
| P(PERIOD FOR WHICH I/O OCCURRENCE COUNT IS MONITORED) | 1 s |
| L (PERCENTAGE OF NUMBER OF VOLUMES WHOSE CACHE CAPACITY IS TO BE REDUCED WITH RESPECT TO NUMBER OF ALL VOLUMES) | 20% |

| SERVER | CACHE MISS (A) | CACHE HIT (B) | A-B |
|---|---|---|---|
| #0 | 150μ | 30μ | 120μs |
| #1 | 150μ | 60μ | 90μs |
| #2 | 210μ | 60μ | 150μs |
| #3 | 240μ | 30μ | 210μs |
| #4 | 240μ | 210μ | 30μs |
| #5 | 180μ | 90μ | 90μs |

A: CACHE MISS (TOTAL OF THREE TIMES)
B: CACHE HIT (TOTAL OF THREE TIMES)

| VOLUME | CONFIGURED SERVERS |
|--------|--------------------|
| #0 | #0,#1,#2 |
| #1 | #2,#3 |
| #2 | #4,#5 |

| RANK | VOLUME | A-B |
|---|---|---|
| | #0 | 90μs |
| | #1 | 150μs |
| | #2 | 30μs |

⇓

F2 ~ 2143

| RANK | VOLUME | A-B |
|---|---|---|
| 1 | #2 | 30μs |
| 2 | #0 | 90μs |
| 3 | #1 | 150μs |

| TEST DATA | ADDRESS |
|---|---|
| #0-1 | 0x1234 |
| #0-2 | 0x2345 |
| #0-3 | 0x3456 |
| #1-1 | 0x4567 |
| #1-2 | 0x5678 |
| #1-3 | 0x6789 |

| VOLUME | I/O COUNT |
|---|---|
| #0 | 3000 |
| #1 | 50 |
| #2 | 2500 |

FIG. 18

| RANK | VOLUME | A-B |
|---|---|---|
| 1 | #3 | 15μs |
| 2 | #2 | 30μs |
| 3 | #4 | 45μs |
| 4 | #0 | 90μs |
| 5 | #1 | 150μs |

2143

F1

F2

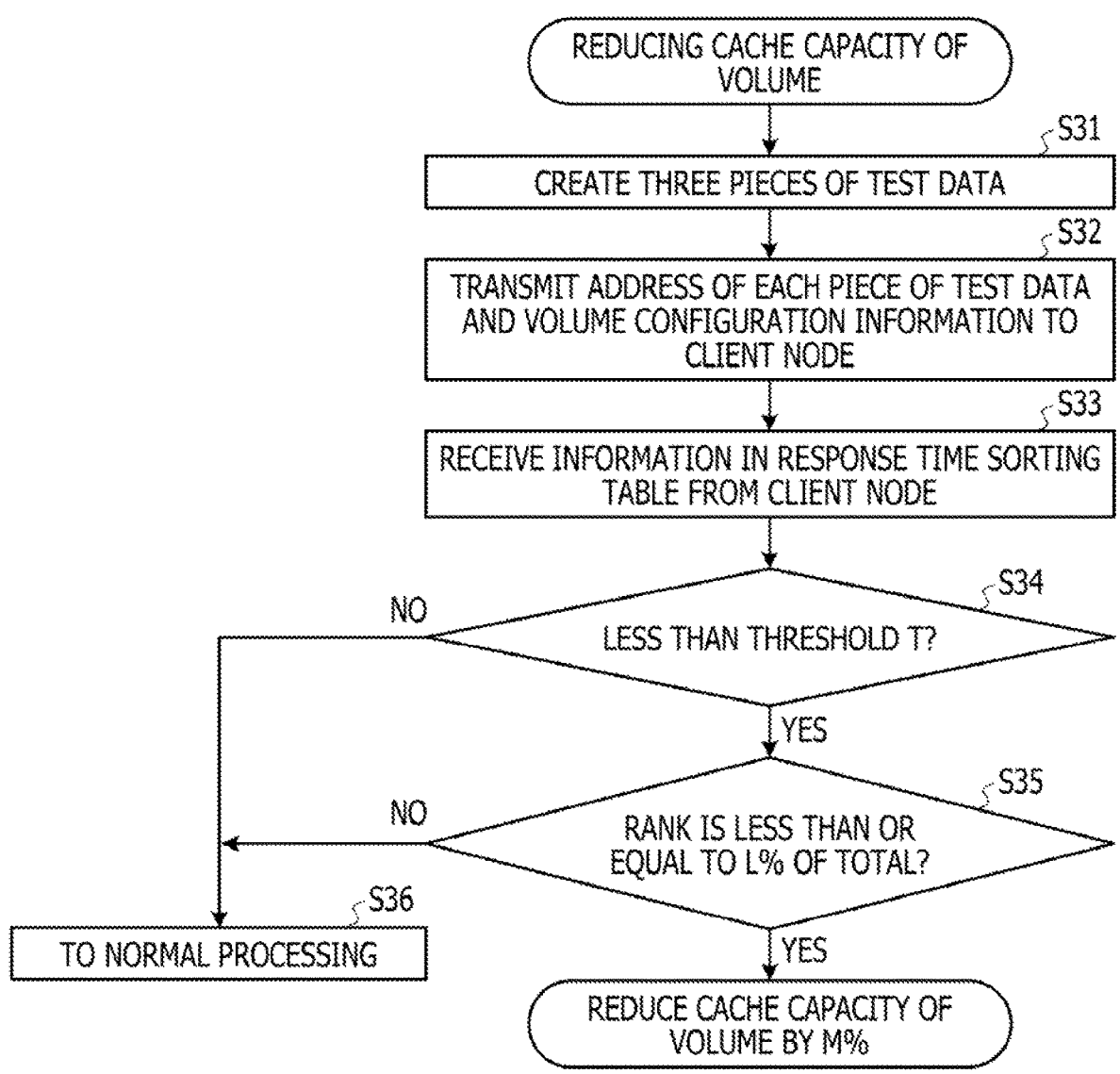

INFORMATION PROCESSING SYSTEM AND INFORMATION PROCESSING METHOD

CROSS-REFERENCE TO RELATED APPLICATION

This application is based upon and claims the benefit of priority of the prior Japanese Patent Application No. 2021-2266, filed on Jan. 8, 2021, the entire contents of which are incorporated herein by reference.

FIELD

The embodiment discussed herein is related to an information processing system and an information processing method.

BACKGROUND

In a distributed system having a plurality of volumes in which data is striped across servers, areas usable as a cache are limited. Thus, the size of the divisional cache in each of the volumes may be optimized.

To allocate a large cache to a certain volume, it is conceivable to reduce a cache capacity of a volume having a small performance influence. Since there are a volume having a large performance influence and a volume having a small performance influence on the entire system due to a change in cache capacity, the performance may deteriorate if the cache capacity of a volume that involves many data accesses is reduced.

Accordingly, there is a technique for finding, through a cache simulation, a part where the cache capacity for each volume is to be changed. For example, a cache hit rate for each cache capacity is simulated, and a timing at which the cache hit rate is insufficient is found.

Examples of the related art include as follows: Japanese Laid-open Patent Publication No. 2005-327138, International Publication Pamphlet No. WO 2018/189847, and Japanese Laid-open Patent Publication No. 2005-115438.

SUMMARY

According to an aspect of the embodiments, an information processing system includes: an information processing apparatus; and a terminal apparatus, wherein the terminal apparatus includes a first processor configured to measure response times for respective volumes in the information processing apparatus, and the information processing apparatus includes a second processor configured to reduce a capacity of an allocated cache memory in accordance with the response times.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a diagram illustrating a reference value management table in the client node illustrated in FIG. 11;

FIG. 13 is a diagram illustrating a response time management table in the client node illustrated in FIG. 11;

FIG. 15 is a diagram illustrating a response time sorting table in the client node illustrated in FIG. 11;

FIG. 16 is a diagram illustrating a test data storage information table in the server illustrated in FIG. 11;

FIG. 18 is a diagram illustrating a response time sorting table after sorting, which is a modification example, in the client node illustrated in FIG. 11;

FIGS. 24A and 24B illustrate a flowchart for describing a response time measurement process, which is a modification example, performed in the information processing system illustrated in FIG. 7.

DESCRIPTION OF EMBODIMENTS

However, simply monitoring the cache hit rate for each volume is not enough to avoid an influence of striping that may occur even if the cache capacity is increased. In a distributed system using a striping technique, an access to certain data is not permitted until the entire set of stripes constituting the data is complete. Thus, if the cache capacity is changed without consideration of striping, the performance does not improve.

For example, in the case where the cache capacity is reduced by using the cache hit rate alone as an index, it is conceivable to increase the cache capacity of a volume #1 when the cache hit rate of the volume #1 is high and the cache hit rate of a volume #2 is low. However, in a distributed system, a server holding a certain stripe may cause a delay due to, for example, a high load or the like caused by simultaneous accesses resulting from a poor network condition or an arrangement of stripes. Therefore, the overall performance may not improve even if the cache hit rate is increased.

In one aspect, an object is to improve cache utilization efficiency of the entire system.

[A] Related Example

Figure 1:
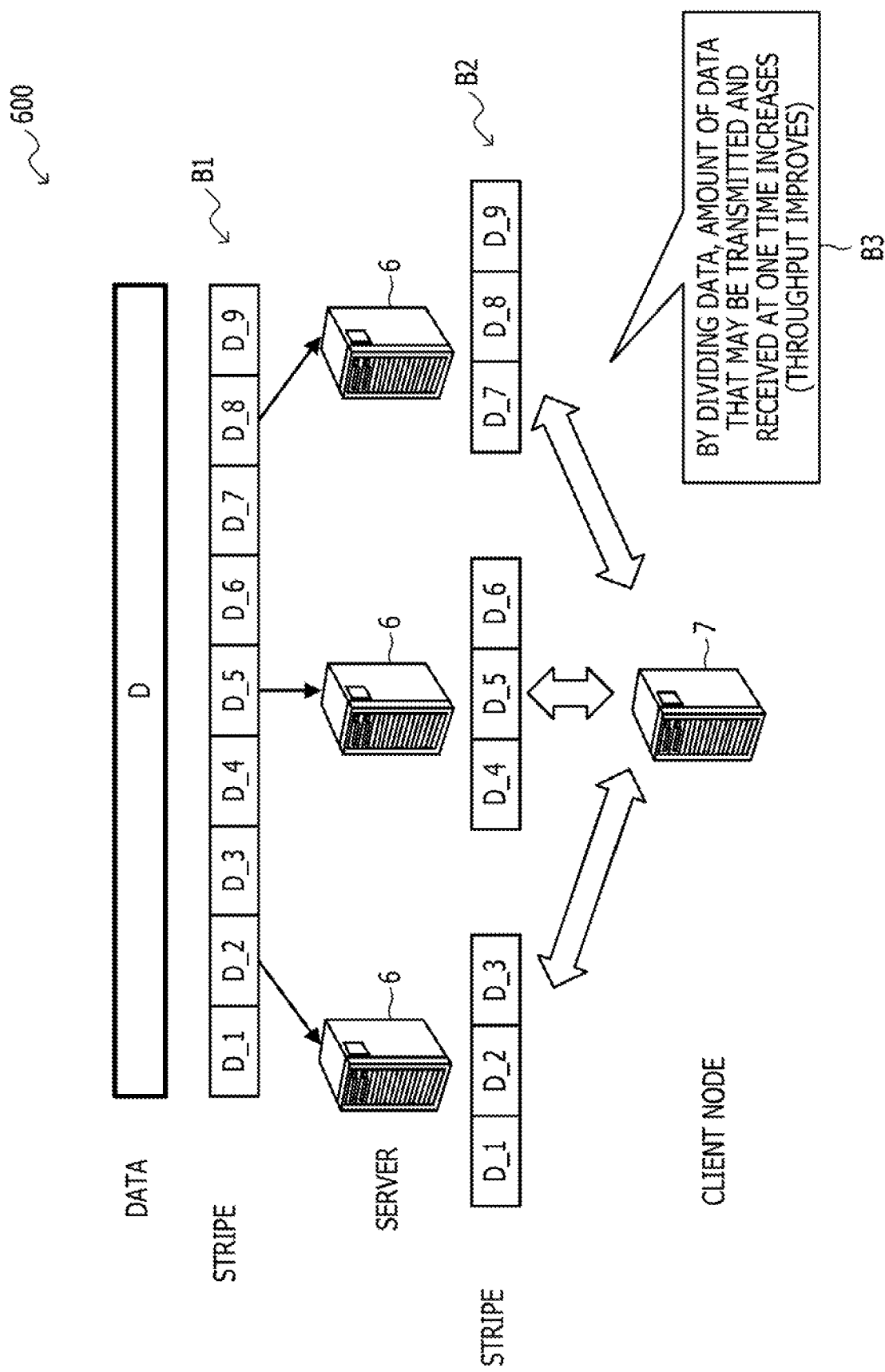
FIG. 1 is a diagram for describing data striping in a related example.

FIG. 1 is a diagram for describing data striping in a related example.

An information processing system 600 includes a plurality of servers 6 and a client node 7.

As indicated by a reference sign B1, one piece of data D is divided into a plurality of stripes D_1 to D_9. As indicated by a reference sign B2, the stripes D_1 to D_9 are stored in the corresponding servers 6 in a distributed manner. In the example illustrated in FIG. 1, the stripes D_1 to D_3, the stripes D_4 to D_6, and the stripes D_7 to D_9 are stored in the respective servers 6 in a distributed manner.

As indicated by a reference sign B3, the data D is divided by data striping, so that an amount of data that may be transmitted and received at one time increases. Consequently, a throughput in handling a large amount of data may improve.

Figure 2:
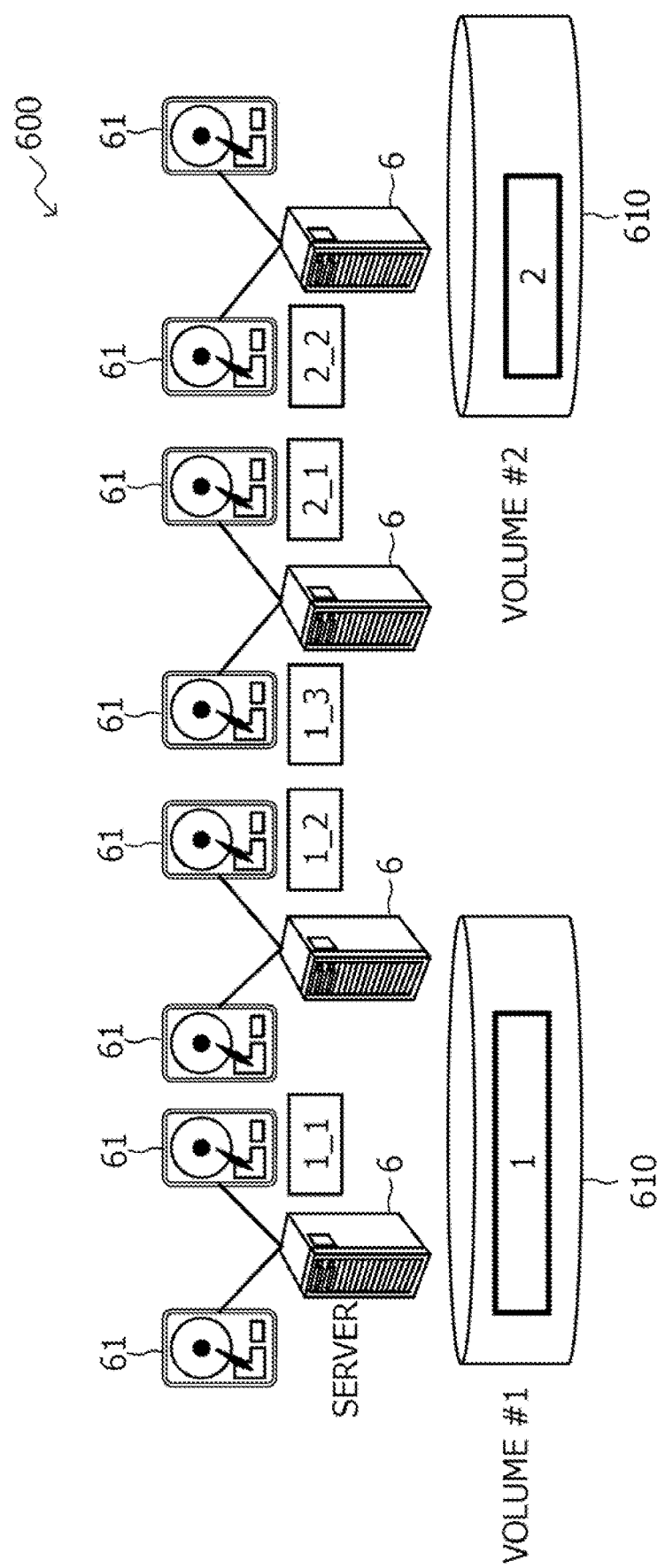
FIG. 2 is a diagram for describing a volume management method performed by each server in the related example.

FIG. 2 is a diagram for describing a volume management method performed by each of the servers 6 in the related example.

Each of the servers 6 includes a plurality of storage devices 61. In the example illustrated in FIG. 2, the plurality of storage devices 61 hold the stripes "1_1" to "1_3", "2_1", and "2_2" in a distributed manner.

The client node 7 illustrated in FIG. 1 recognizes the stripes held in the respective storage devices 61 as one piece of data stored in a volume 610. In the example illustrated in FIG. 2, data "1" is stored in a volume #1 and data "2" is stored in a volume #2. The data "1" is constituted by the stripes "1_1" to "1_3". The data "2" is constituted by the stripes "2_1" and "2_2".

Figure 3:
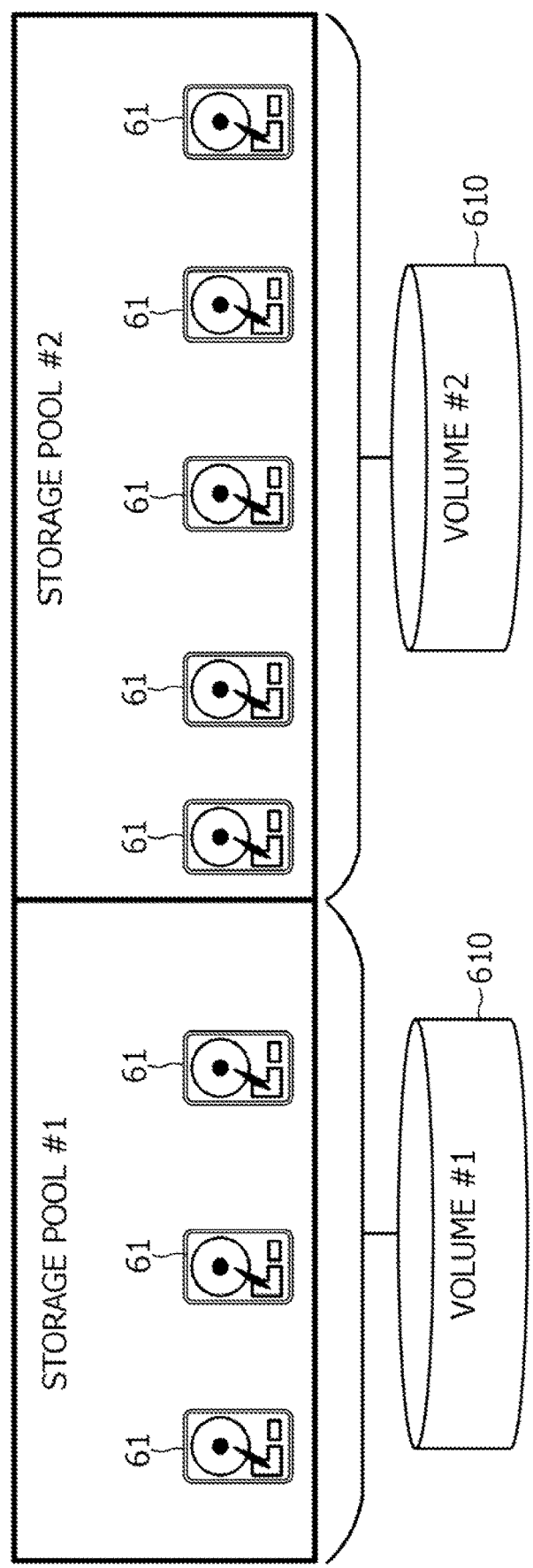
FIG. 3 is a diagram for describing a configuration of volumes in the related example.

FIG. 3 is a diagram for describing a configuration of the volumes 610 in the related example.

Each of the volumes 610 is a logical storage area and constitutes a storage pool including the plurality of storage devices 61. In the example illustrated in FIG. 3, the volume #1 corresponds to a storage pool #1 and includes three storage devices 61. The volume #2 corresponds to a storage pool #2 and includes five storage devices 61.

Figure 4:
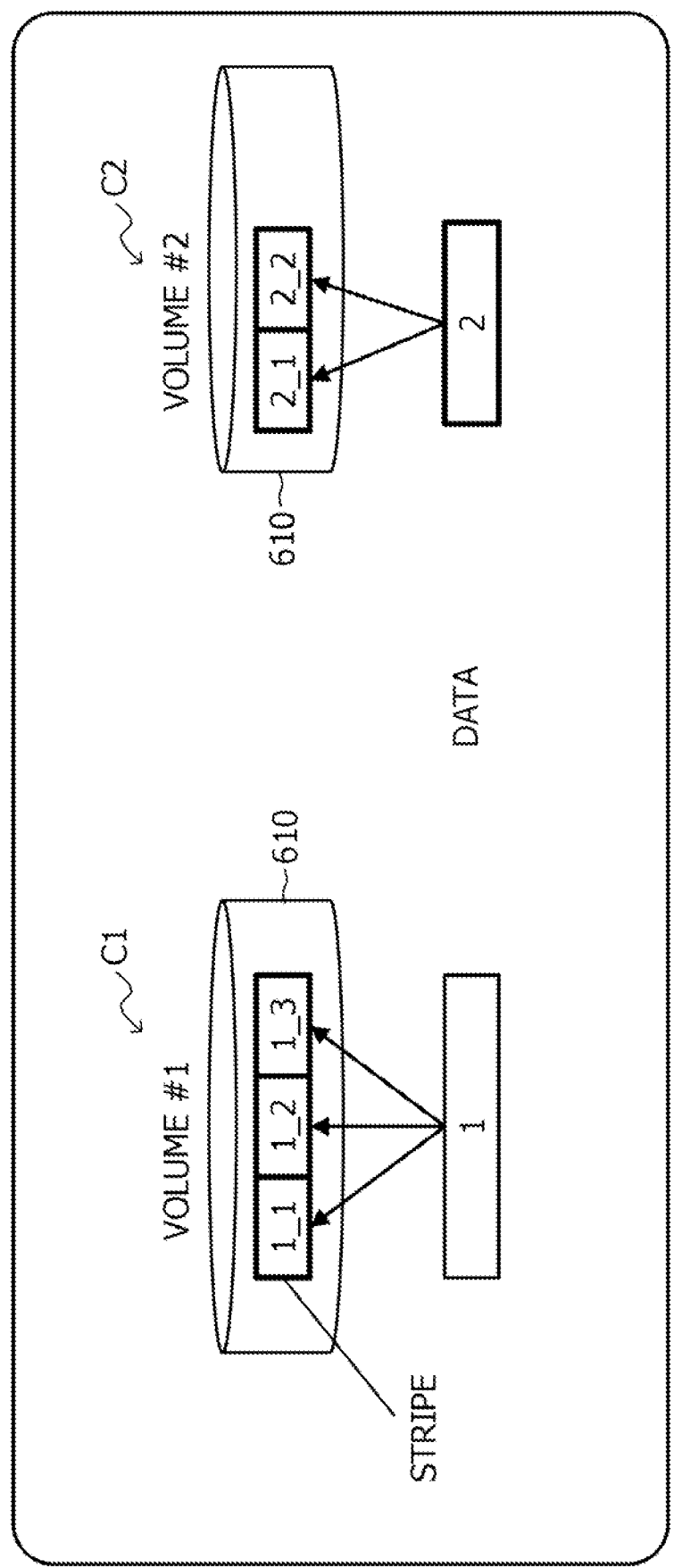
FIG. 4 is a diagram for describing a configuration of stripes in the related example.

FIG. 4 is a diagram for describing a configuration of the stripes in the related example.

A stripe is a portion of data obtained by dividing the data into portions each having a certain size. In an example indicated by a reference sign C1, the data "1" in the volume #1 is divided into the stripes "1_1" to "1_3". In an example indicated by a reference sign C2, the data "2" in the volume #2 is divided into the stripes "2_1" and "2_2".

An access to the data is not permitted unless all the stripes are complete.

Figure 5:
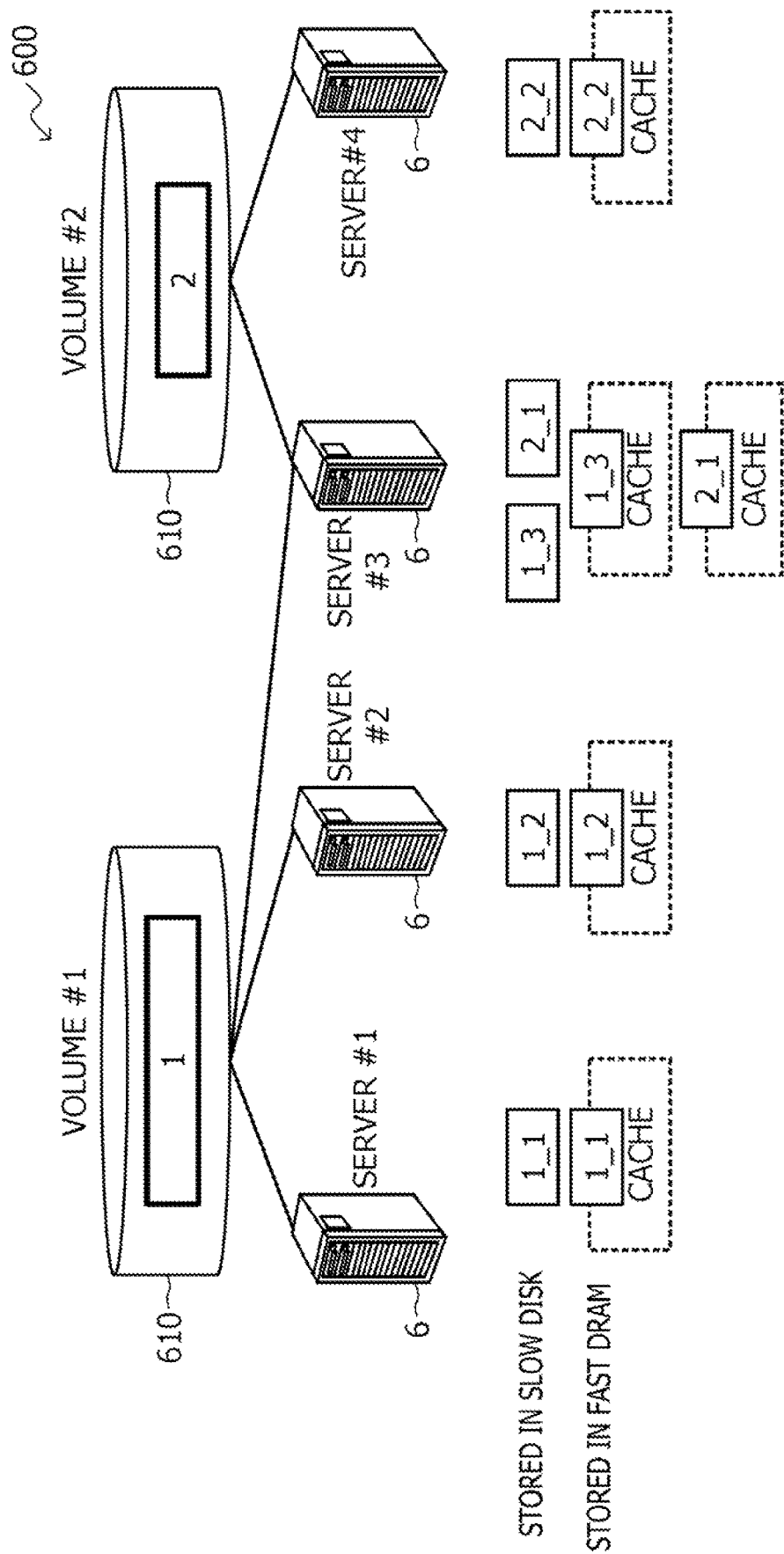
FIG. 5 is a diagram for describing a stripe distribution process performed in an information processing system serving as the related example.

FIG. 5 is a diagram for describing a stripe distribution process performed in the information processing system 600 serving as the related example.

In an example illustrated in FIG. 5, the stripe "1_1" is stored in a disk having a slow processing speed and a dynamic random-access memory (DRAM) having a fast processing speed in a server #1, and the stripe "1_2" is stored in a disk having a slow processing speed and a DRAM having a fast processing speed in a server #2. The stripes "1_3" and "2_1" are stored in a disk having a slow processing speed and a DRAM having a fast processing speed in a server #3, and the stripe "2_2" is stored in a disk having a slow processing speed and a DRAM having a fast processing speed in a server #4.

As described above, in the example illustrated in FIG. 5, all the stripes are stored in the disks having a slow processing speed and are also stored as caches in the DRAMs having a fast processing speed.

The stripes "1_1" to "1_3" respectively stored in the servers #1 to #3 are managed as the data "1" in the volume #1. The stripes "2_1" and "2_2" respectively stored in the servers #3 and #4 are managed as the data "2" in the volume #2.

Figure 6:
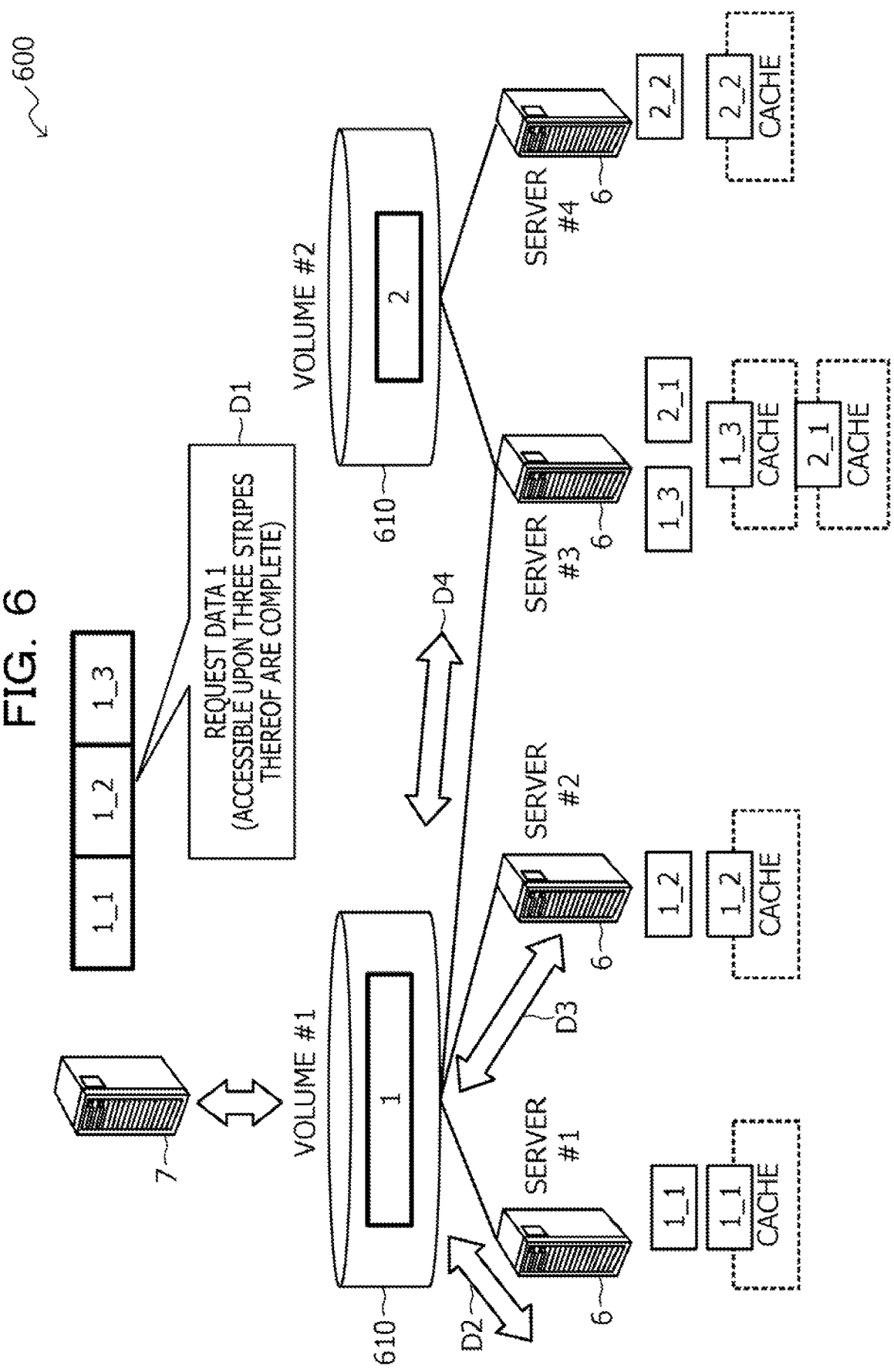
FIG. 6 is a diagram for describing a data access process performed in the information processing system serving as the related example.

FIG. 6 is a diagram for describing a data access process performed in the information processing system 600 serving as the related example.

As indicated by a reference sign D1, the client node 7 requests the data "1" which is accessible upon the three stripes "1_1" to "1_3" being complete. As indicated by reference signs D2 to D4, the client node 2 acquires the stripes "1_1" to "1_3" from the corresponding servers #1 to #3 via the volume #1 storing the data "1".

[B] Embodiment

An embodiment will be described below with reference to the drawings. The embodiment described below is merely illustrative and is not intended to exclude employment of various modification examples or techniques that are not explicitly described in the embodiment. For example, the present embodiment may be implemented by variously modifying the embodiment without departing from the gist of the embodiment. Each of the drawings is not intended to indicate that the drawn elements alone are included. Thus, other functions or the like may be included.

The same reference sign denotes the same or similar elements in the drawings, so that the description thereof is omitted below.

[B-1] Examples of Configurations

Figure 7:
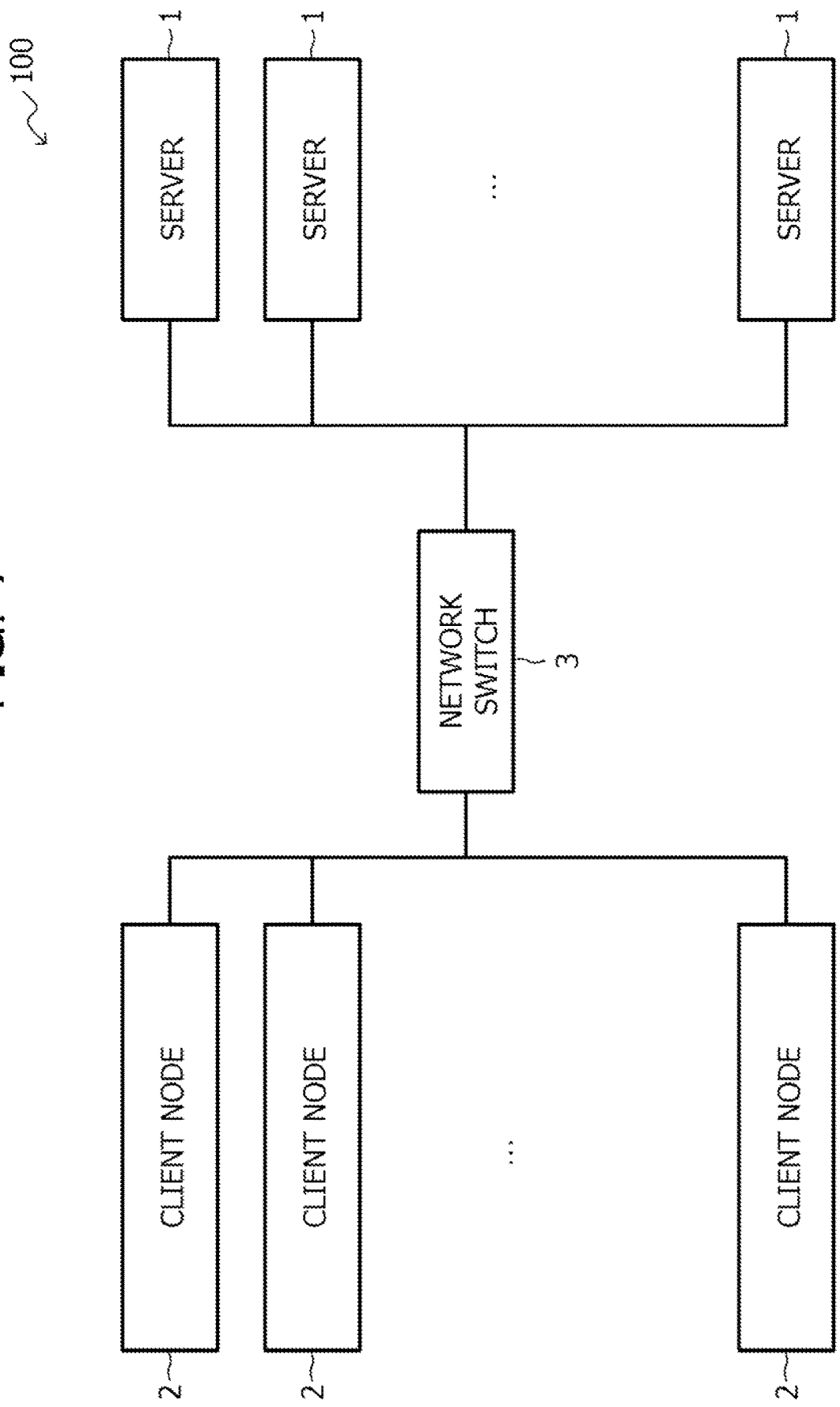
FIG. 7 is a block diagram schematically illustrating a configuration of an information processing system serving as an example of an embodiment.

FIG. 7 is a block diagram schematically illustrating an example of a configuration of an information processing system 100 serving as an example of an embodiment The information processing system 100 includes a plurality of servers 1, a plurality of client nodes 2, and a network switch 3. The plurality of servers 1 and the plurality of client nodes 2 are coupled to each other via the network switch 3.

Each of the servers 1 is a computer (for example, an information processing apparatus) having a server function.

Each of the client nodes 2 is an example of a terminal apparatus. The client nodes 2 access the servers 1 and acquire various kinds of data.

Figure 8:
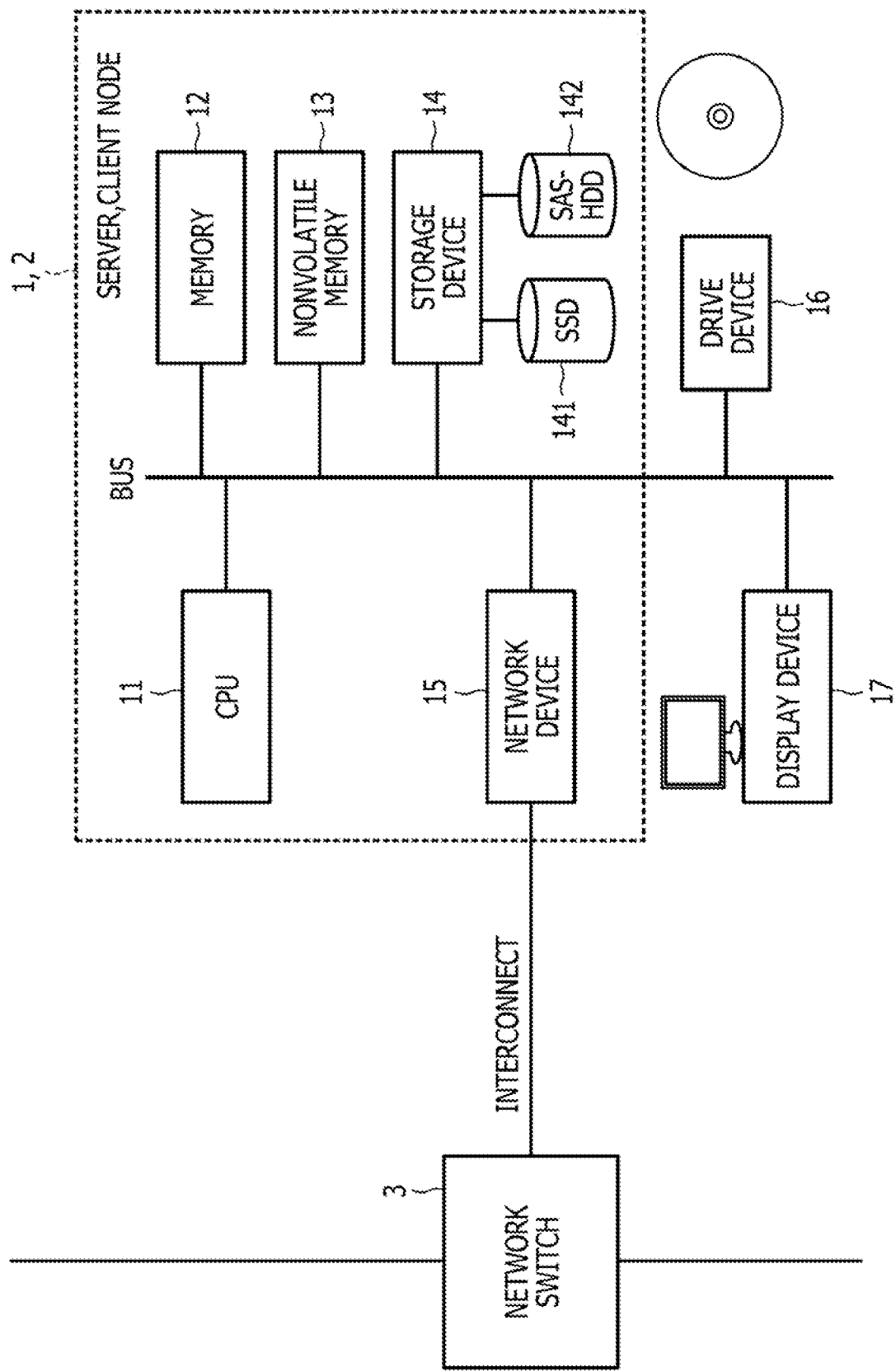
FIG. 8 is a block diagram schematically illustrating an example of a hardware configuration of a server and a client node illustrated in FIG. 7.

FIG. 8 is a block diagram schematically illustrating an example of a hardware configuration of each of the servers 1 illustrated in FIG. 7.

The server 1 may include a central processing unit (CPU) 11, a memory 12, a nonvolatile memory 13, a storage device 14, and a network device 15. The server 1 may be coupled to a drive device 16 and a display device 17. The client nodes 2 also have substantially the same hardware configuration as the servers 1.

The memory 12 is, for example, a storage device including a read-only memory (ROM) and a random-access memory (RAM). The RAM may be, for example, a DRAM. Programs (software programs) such as a Basic Input/Output System (BIOS) may be written in the ROM of the memory 12. The software programs in the memory 12 may be loaded and executed by the CPU 11 as appropriate. The RAM of the memory 12 may be used as a primary storage memory or a working memory.

The nonvolatile memory 13 has a higher access speed than the storage device 14 and may be used as a secondary storage memory.

The storage device 14 is coupled to, for example, a solid-state drive (SSD) 141 and a Serial Attached Small Computer System Interface (SCSI)-Hard Disk Drive (SAS-HDD) 142.

The network device 15 is coupled to the network switch 3 via an interconnect.

The drive device 16 is configured so that a recording medium is removably inserted thereto. The drive device 16 is configured to be able to read information recorded on a recording medium in a state in which the recording medium is inserted thereto. In this example, the recording medium is portable. For example, the recording medium is a flexible disk, an optical disc, a magnetic disk, a magneto-optical disk, a semiconductor memory, or the like.

The display device 17 is a liquid crystal display, an organic light-emitting diode (OLED) display, a cathode ray tube (CRT) display, an electronic paper display, or the like and displays various kinds of information for an operator or the like.

The CPU 11 is a processing unit that performs various kinds of control and computation. The CPU 11 implements various functions by executing an operating system (OS) and a program that are stored in the memory 12.

The programs for implementing the functions of the CPU 11 are provided, for example, in a form of the aforementioned recording medium on which the programs are recorded. A computer reads the programs from the recording medium via the drive device 16, transfers the programs to and stores the programs in an internal storage device or an external storage device, and uses the programs. For example, the programs may be recorded in a storage device (on a recording medium) such as a magnetic disk, an optical disc, or a magneto-optical disk and may be provided from the storage device to the computer via a communication channel.

When the functions of the CPU 11 are implemented, the programs stored in the internal storage device (in the present embodiment, the memory 12) may be executed by a microprocessor (in the present embodiment, the CPU 11) of the computer. In this case, the programs recorded on the recording medium may be read and executed by the computer.

The CPU 11 controls operations of the entire server 1, for example. A device for controlling the operations of the entire server 1 is not limited to the CPU 11 and may be, for example, any one of an MPU, a DSP, an ASIC, a PLD, and an FPGA. The device for controlling the operations of the entire server 1 may be a combination of two or more kinds of the CPU, the MPU, the DSP, the ASIC, the PLD, and the FPGA. The MPU is an abbreviation for "microprocessor unit". The DSP is an abbreviation for "digital signal processor". The ASIC is an abbreviation for "application-specific integrated circuit". The PLD is an abbreviation for "programmable logic device". The FPGA is an abbreviation for "field-programmable gate array".

Figure 9:
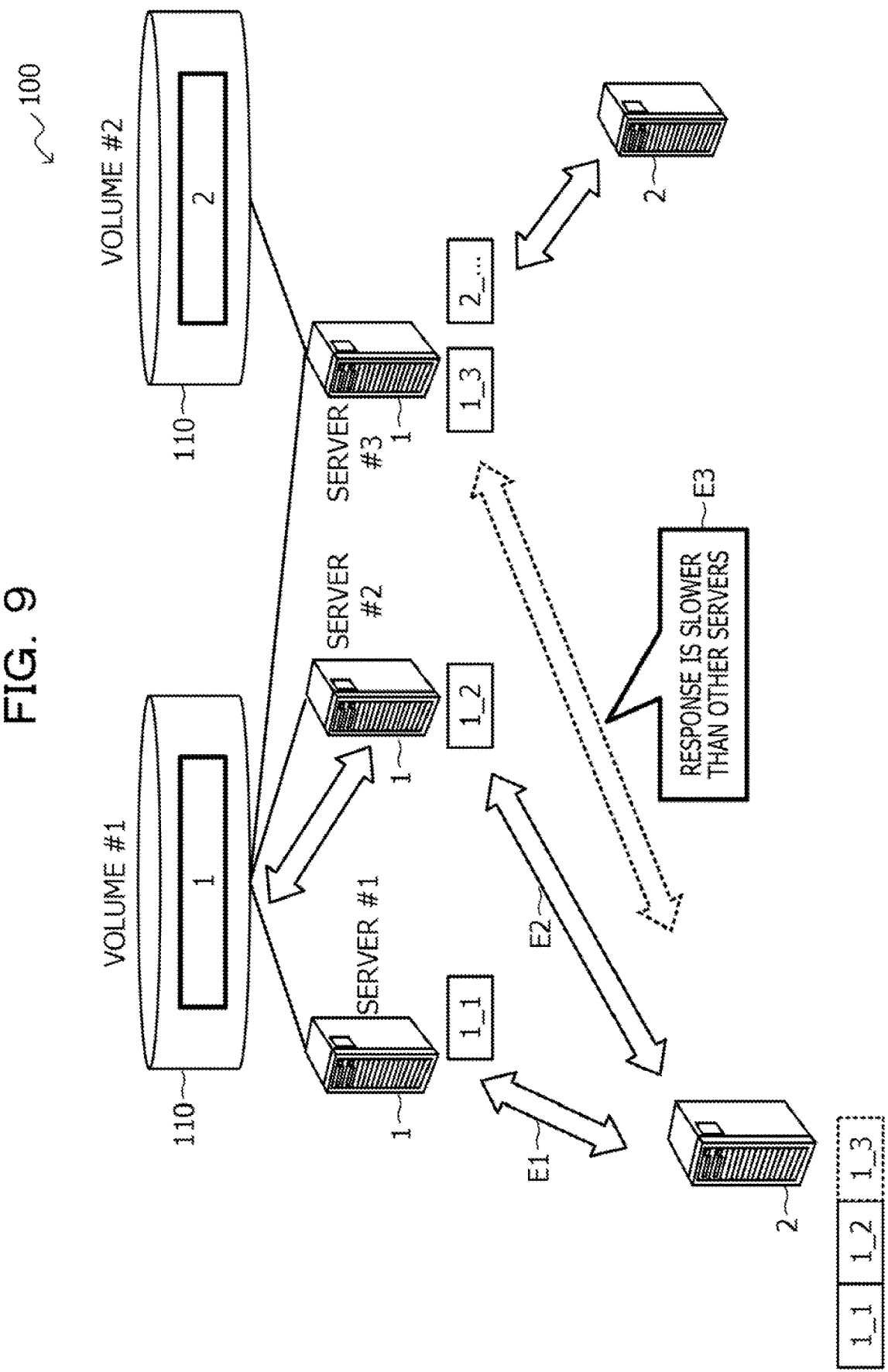
FIG. 9 is a diagram for describing a cache capacity setting process performed in the information processing system illustrated in FIG. 7.

FIG. 9 is a diagram for describing a cache capacity setting process performed in the information processing system 100 illustrated in FIG. 7.

In an example of the embodiment, as a method of selecting a volume whose cache capacity is to be reduced, a response time for a request for each stripe from the client node 2 is measured. Test data is created in each of the servers 1, and the response time is measured when an access is made for the first time and when an access is made for the second time. If a difference between the response time for the first access and the response time for the second access is less than or equal to a predetermined value, the cache capacity of the corresponding volume is decreased.

A distributed system may have a high-load server depending on arrangement of the volumes 110 or the like. Thus, when degradation in performance of a certain server 1 is confirmed by measurement of response times for the individual servers 1, the cache capacity is decreased since the effect is scarcely yielded even if the other server(s) 1 constituting the corresponding volume 110 has (have) the cache.

To improve the performance of the distributed system, a cache is not allocated in the high-load server 1 scarcely yielding a cache effect, and the cache capacity of the volume 110 that improves the performance by having a cache is increased. In this manner, the overall performance is improved.

In the example illustrated in FIG. 9, stripes "1_1" to "1_3" are respectively stored in servers #1 to #3. When the client node 2 reads each of the stripes "1_1" to "1_3", measurement is performed, which indicates that a response to an access to the server #3 indicated by a reference sign E3 among accesses indicated by reference signs E1 to E3 is slower than responses to accesses to the other servers #1 and #2.

In the example illustrated in FIG. 9, the client node 2 is not permitted to access the data "1" in the volume #1 until the stripes "1_1" to "1_3" are complete. Thus, the cache capacity for each of the stripes "1_1" to "1_3" in the respective servers #1 to #3 is reduced. The cache capacity for the data "2" in the volume #2 associated with the server #3 may be increased.

Figure 10:
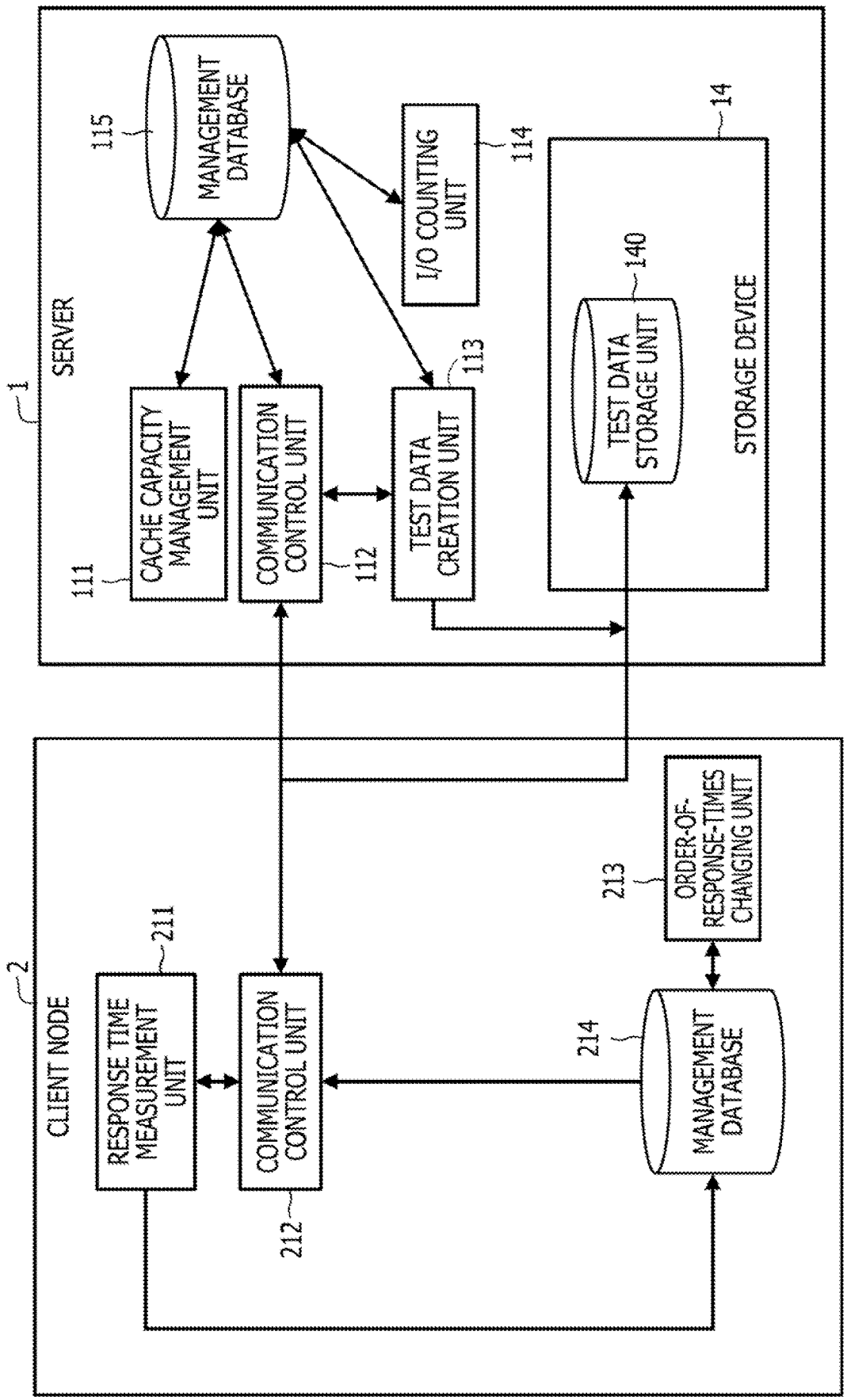
FIG. 10 is a block diagram schematically illustrating an example of a software configuration of the server and the client node illustrated in FIG. 7.

FIG. 10 is a black diagram schematically illustrating an example of a software configuration in the server 1 and the client node 2 illustrated in FIG. 7.

The CPU 11 of the server 1 illustrated in FIG. 8 functions as a cache capacity management unit 111, a communication control unit 112, a test data creation unit 113, and an I/O counting unit 114. The memory 12 of the server 1 illustrated in FIG. 8 holds a management database 115. The storage device 14 of the server 1 holds a test data storage unit 140.

The CPU 11 of the client node 2 illustrated in FIG. 8 functions as a response time measurement unit 211, a communication control unit 212, and an order-of-response-times changing unit 213. The memory 12 of the client node 2 illustrated in FIG. 8 holds a management database 214.

In response to a request from the client node 2, the test data creation unit 113 creates test data with reference to the management database 115 and causes the created test data to be stored in the test data storage unit 140.

The I/O counting unit 114 counts I/Os made in this server 1 from the client node 2 and stores the count result in the management database 115.

The communication control unit 112 transmits and receives data to and from the client node 2.

The cache capacity management unit 111 determines whether to increase or decrease a cache allocated to each stripe, with reference to the management database 115 that includes the sorted response time measurement results that are created in the client node 2 as described later.

The response time measurement unit 211 measures a response time for a request to access data in each of the servers 1 and stores a measurement result in the management database 214.

The communication control unit 212 transmits and receives data to and from the server 1.

The order-of-response-times changing unit 213 sorts the response time measurement results stored in the management database 214 in an order based on the response times and stores the sorted response time measurement results in the management database 214.

Figure 11:
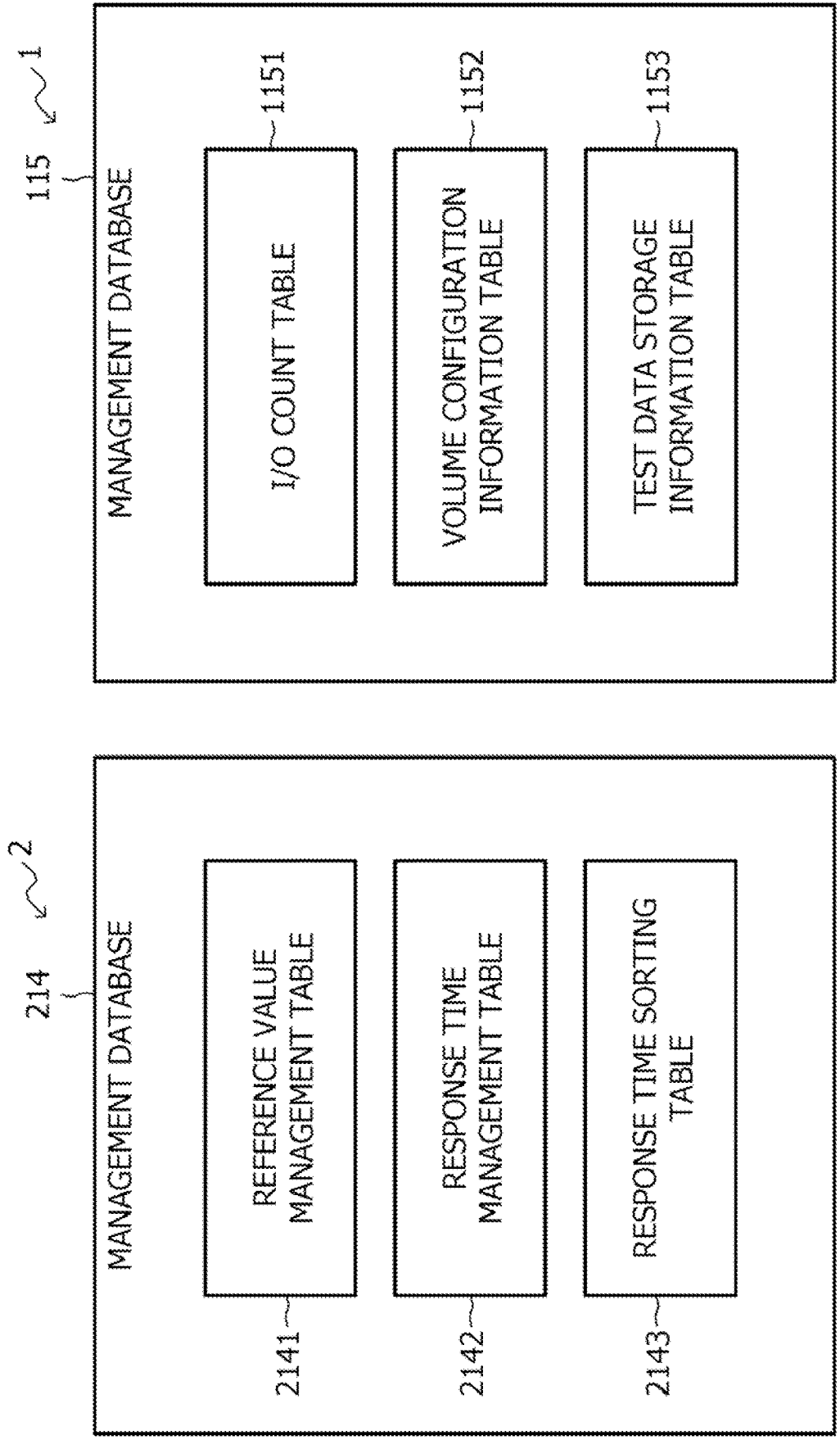
FIG. 11 is a block diagram schematically illustrating a configuration of management databases in the server and the client node illustrated in FIG. 10.

FIG. 11 is a block diagram schematically illustrating a configuration of the management database 115 in the server 1 illustrated in FIG. 10 and the management database 214 in the client node 2 illustrated in FIG. 10.

The management database 115 of the server 1 includes an I/O count table 1151, a volume configuration information table 1152, and a test data storage information table 1153. The I/O count table 1151 will be described later with reference to FIG. 17 and the like. The volume configuration information table 1152 will be described later with reference to FIG. 14 and the like. The test data storage information table 1153 will be described later with reference to FIG. 16 and the like.

The management database 214 of the client node 2 includes a reference value management table 2141, a response time management table 2142, and a response time sorting table 2143. The reference value management table 2141 will be described later with reference to FIG. 12 and the like. The response time management table 2142 will be described later with reference to FIG. 13 and the like. The response time sorting table 2143 will be described later with reference to FIG. 15 and the like.

FIG. 12 is a diagram illustrating the reference value management table 2141 in the client node 2 illustrated in FIG. 11.

The reference value management table 2141 defines reference values used in common by the individual servers 1.

M denotes a percentage by which the cache is to be reduced and may be, for example, 2%. T denotes a lower limit value of the response time for reducing the cache capacity and may be, for example, 20 μs. N denotes a time interval at which cache effect measurement is performed and may be, for example, 5 seconds. I denotes a first reference value of an I/O occurrence count and may be, for example, 2000 times. J denotes a second reference value of the I/O occurrence count and may be, for example, 50 times. P denotes a period for which the I/O occurrence count is monitored and may be, for example, 1 second. L denotes a percentage of the number of volumes whose cache capacity is to be reduced with respect to the number of all the volumes and may be, for example, 20%.

FIG. 13 is a diagram illustrating the response time management table 2142 in the client node 2 illustrated in FIG. 11.

The response time management table 2142 holds, for each of the servers 1 (the servers #0 to #5 in an example of illustrated in FIG. 13), a total value of three cache miss response times, a total value of three cache hit response times, and a difference between the total value of the cache miss response times and the total value of the cache hit response times.

Figure 14:
FIG. 14 is a diagram illustrating a volume configuration information table in the server illustrated in FIG. 11.

FIG. 14 is a diagram illustrating the volume configuration information table 1152 in the server 1 illustrated in FIG. 11.

The volume configuration information table 1152 holds identifiers of the servers 1 associated with each of the volumes 110. In the example illustrated in FIG. 14, the servers #0, #1, and #2 are associated with the volume #0, the servers #2 and #3 are associated with the volume #1, and the servers #4 and #5 are associated with the volume #2.

Figure 15:
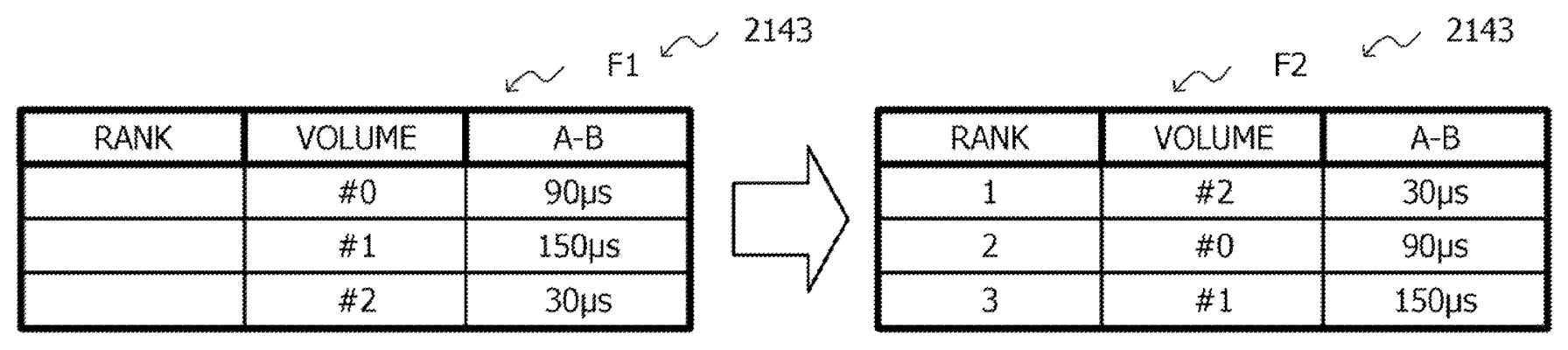

FIG. 15 is a diagram illustrating the response time sorting table 2143 in the client node 2 illustrated in FIG. 11.

The response time sorting table 2143 holds a rank, a volume identifier, and a difference between the total value of the cache miss response times and the total value of cache hit response times.

In the response time sorting table 2143 before sorting indicated by a reference sign F1, fields for the rank are blank, and the differences between the total value of the cache miss response times and the total value of the cache hit response times are registered in ascending order of the volume identifiers.

In the response time sorting table 2143 after sorting indicated by a reference sign F2, the ranks and the volume identifiers are registered in ascending order of the differences between the total value of the cache miss response times and the total value of the cache hit response times. In the example illustrated in FIG. 15, at the rank "1", the difference between the total value of the cache miss response times and the total value of the cache hit response times in the volume #2 is registered as 30 μs.

The response time sorting table 2143 indicates that the cache effect is smaller as the difference between the total value of the cache miss response times and the total value of the cache hit response times is smaller and the rank is higher.

FIG. 16 is a diagram illustrating the test data storage information table 1153 in the server 1 illustrated in FIG. 11.

The test data storage information table 1153 holds an identifier of test data and an address where the test data is stored in the test data storage unit 140.

In the example illustrated in FIG. 16, three pieces of test data #0-1, #0-2, and #0-3 for the server #0 and three pieces of test data #1-1, #1-2, and #1-3 for the server #1 are illustrated.

Figure 17:
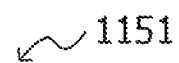
FIG. 17 is a diagram illustrating an input/output (I/O) count table in the server illustrated in FIG. 11.

FIG. 17 is a diagram illustrating the I/O count table 1151 in the server 1 illustrated in FIG. 11.

The I/O count table 1151 holds an I/O count for each of the volumes 110 (the volumes #0 to #2 in the example illustrated in FIG. 17). The held I/O count may be reset every P seconds, which is a period for which the I/O occurrence count is monitored.

FIG. 18 is a diagram illustrating the response time sorting table 2143 after sorting, which is a modification example, in the client node 2 illustrated in FIG. 11.

In the example illustrated in FIG. 18, the difference between the total value of the cache miss response times and the total value of the cache hit response times is illustrated for each of the five volumes #0 to #4. When the percentage L of the number of volumes whose cache capacity is to be reduced with respect to the number of all the volumes is 20%, not only the volume #3 with the rank "1" indicated by a reference sign F1 but also the volume #2 with the rank "2" indicated by a reference sign F2 are selected as the volumes 110 whose cache capacity is to be reduced.

[B-2] Example of Operations

A response time measurement process performed in the information processing system 100 illustrated in FIG. 7 will be described in accordance with sequence diagrams (reference signs A1 to A19) illustrated in FIGS. 19 to 21.

Figure 19:
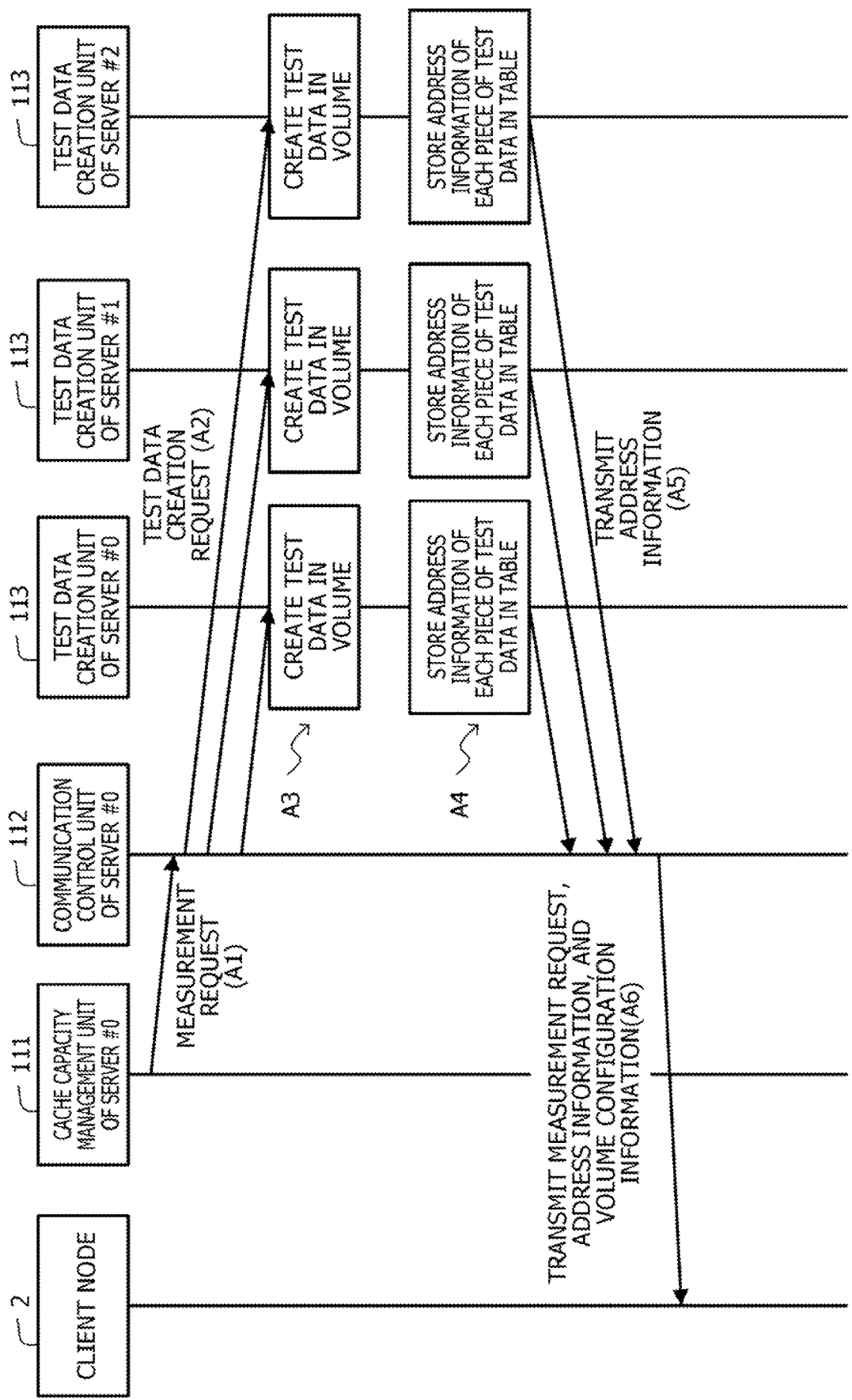
FIG. 19 is a sequence diagram for describing a response time measurement process performed in the information processing system illustrated in FIG. 7.

In FIG. 19, the cache capacity management unit 111 of the server #0 issues a measurement request to the communication control unit 112 (see the reference sign A1).

The communication control unit 112 of the server #0 issues a test data creation request to each of the servers #0 to #2 (see the reference sign A2).

The test data creation unit 113 of each of the servers #0 to #2 creates test data in the volume 110 (see the reference sign A3).

The test data creation unit 113 of each of the servers #0 to #2 stores address information of the corresponding test data in the test data storage information table 1153 (see the reference sign A4).

The test data creation unit 113 of each of the servers #0 to #2 transmits the address information to the communication control unit 112 of the server #0 (see the reference sign A5).

The communication control unit 112 of the server #0 transmits a response time measurement request, the address information, and volume configuration information to the client node 2 (see the reference sign A6).

Figure 20:
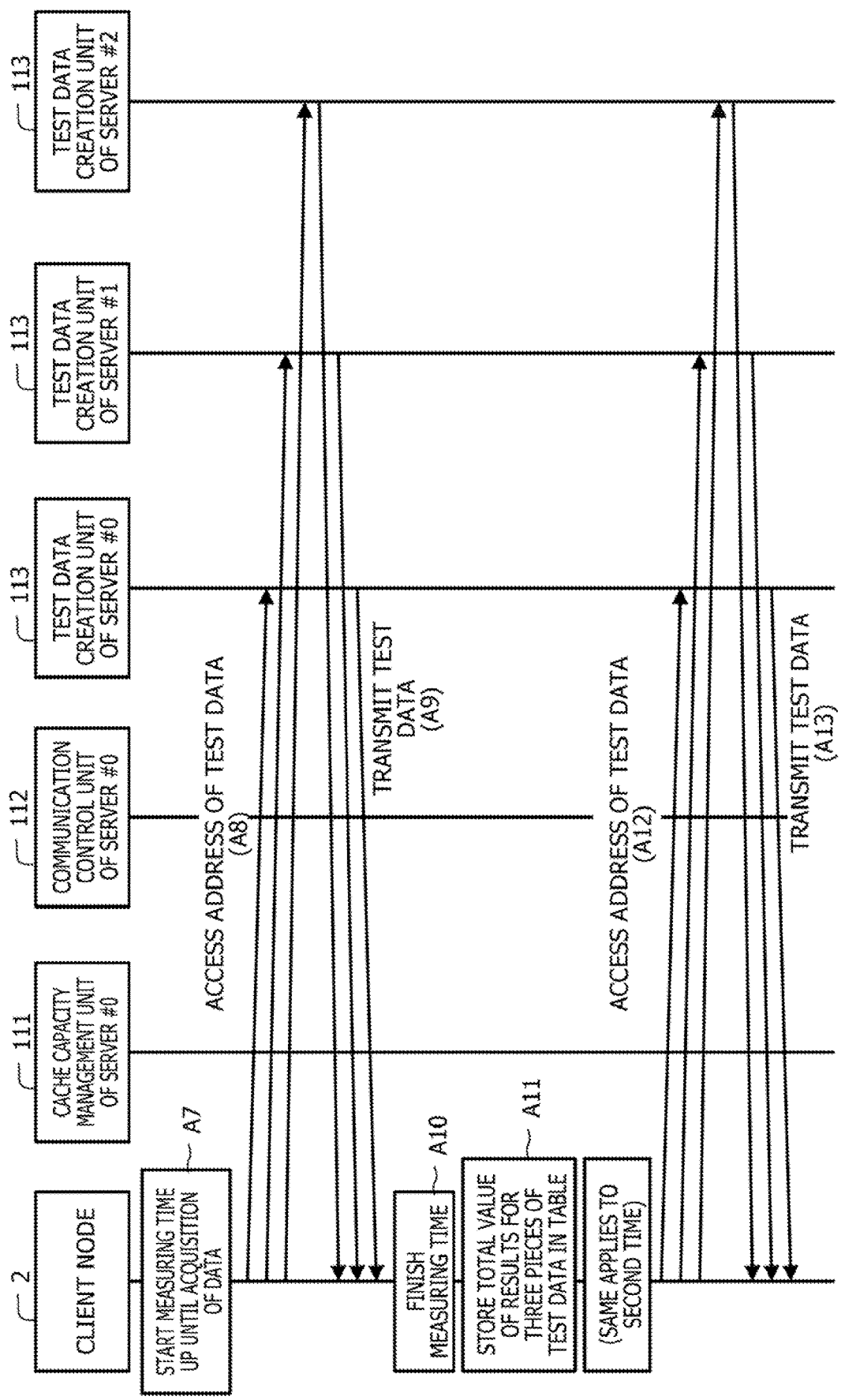
FIG. 20 is a sequence diagram for describing the response time measurement process performed in the information processing system illustrated in FIG. 7.

In FIG. 20, the client node 2 starts measuring a time up until acquisition of the test data (see the reference sign A7).

The client node 2 accesses the address of the test data in each of the servers #0 to #2 (see the reference sign A8).

The test data creation unit 113 of each of the servers #0 to #2 transmits the test data to the client node 2 (see the reference sign A9).

The client node 2 finishes measuring the time (see the reference sign A10).

The client node 2 stores the total values for three test data acquisition results for the servers #0 to #2 in the response time management table 2142 (see the reference sign A11).

The client node 2 similarly accesses the address of the test data in each of the servers #0 to #2 for the second and subsequent times (see the reference sign A12).

The test data creation unit 113 of each of the servers #0 to #2 transmits the test data to the client node 2 (see the reference sign A13).

Figure 21:
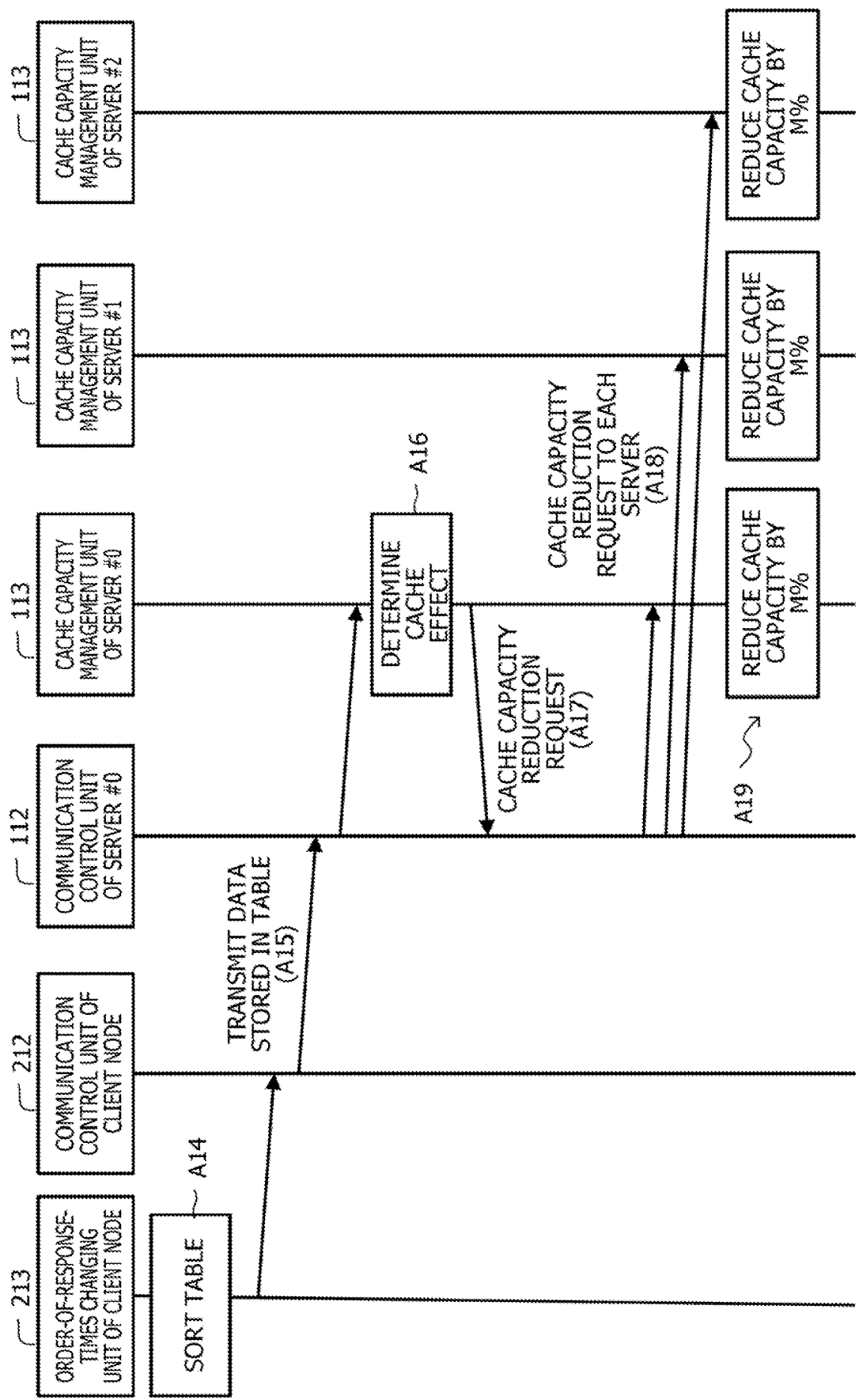
FIG. 21 is a sequence diagram for describing the response time measurement process performed in the information processing system illustrated in FIG. 7.

In FIG. 21, the order-of-response-times changing unit 213 of the client node 2 performs sorting in the response time sorting table 2143 (see the reference sign A14).

The communication control unit 212 of the client node 2 transmits data stored in the response time sorting table 2143 to the server #0 (see the reference sign A15).

The cache capacity management unit 111 of the server #0 determines the cache effect, based on the differences between the total value of the cache miss response times and the total value of the cache hit response times in the response time sorting table 2143 (see the reference sign A16).

The cache capacity management unit 111 of the server #0 issues a cache capacity reduction request to the communication control unit 112 (see the reference sign A17).

The communication control unit 112 of the server #0 transmits the cache capacity reduction request to each of the servers #0 to #2 (see the reference sign A18).

The cache capacity management unit 111 of each of the servers #0 to #2 performs processing of reducing the cache capacity by M % (see the reference sign A19). The response time measurement process then ends.

Figure 22A:
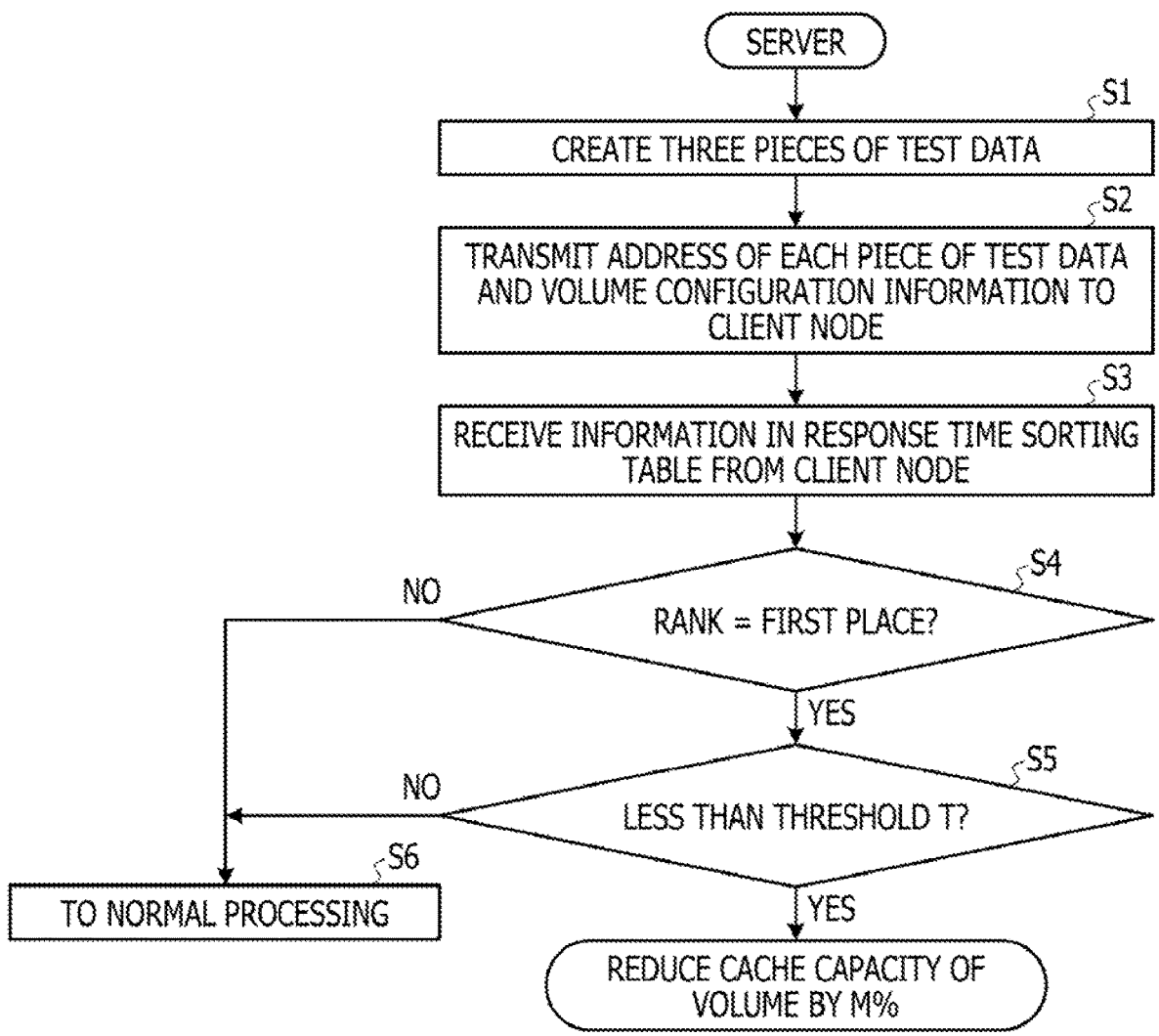
FIGS. 22A and 22B illustrate a flowchart for describing the response time measurement process performed in the information processing system illustrated in FIG. 7.
Figure 22B:
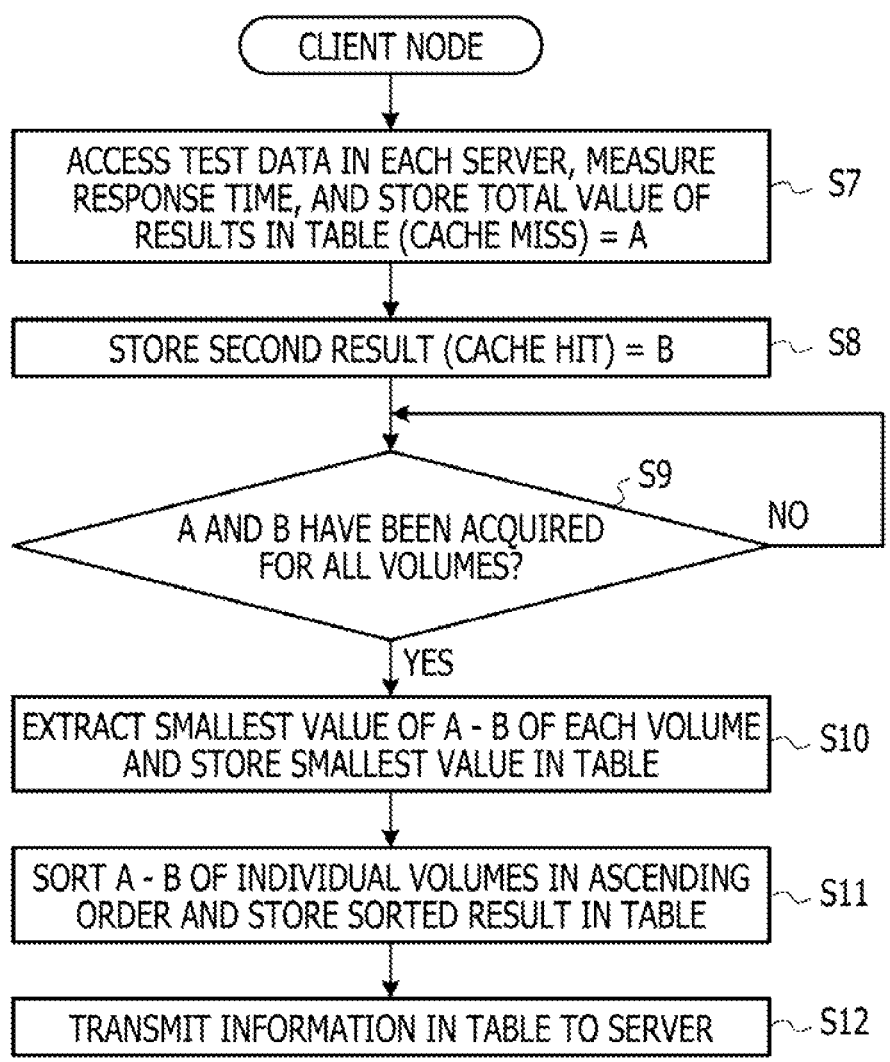

The response time measurement process performed in the information processing system 100 illustrated in FIG. 7 will be described in accordance with a flowchart (steps S1 to S12) illustrated in FIG. 22 (i.e., FIGS. 22A and 22B).

In the server 1, the test data creation unit 113 creates three pieces of test data (step S1).

The communication control unit 112 transmits an address of each piece of test data and the volume configuration information to the client node 2 (step S2).

The communication control unit 112 receives information stored in the response time sorting table 2143 from the client node 2 (step S3).

The cache capacity management unit 111 determines whether the rank of the difference between the total value of the cache miss response times and the total value of the cache hit response times is the first place (step S4).

If the rank is not the first place (see a NO route in step S4), normal processing is performed (step S6).

On the other hand, if the rank is the first place (see a YES route in step S4), the cache capacity management unit 111 determines whether the difference between the total value of the cache miss response times and the total value of the cache hit response times is less than the threshold T (step S5).

If the difference is not less than the threshold T (see a NO route in step S5), the processing proceeds to step S6.

On the other hand, if the difference is less than the threshold T (see a YES route in step S5), the cache capacity of the volume 110 is reduced by M %.

In the client node 2, the response time measurement unit 211 accesses the test data in each of the servers 1 and measures a response time. The response time measurement unit 211 stores the total value of the results as a total value A for cache misses in the response time management table 2142 (step S7).

The response time measurement unit 211 stores the results for the second access as a total value B for cache hits (step S8).

The response time measurement unit 211 determines whether the total values A and B for all the volumes 110 are acquired (step S9).

If there is any volume 110 for which the total values A and B have not been acquired (see a NO route in step S9), the processing in step S9 is repeated.

On the other hand, if the total values A and B are acquired for all the volumes 110 (see a YES route in step S9), the response time measurement unit 211 extracts, for each of the volumes 110, the smallest value among differences A-B between the total values and stores the smallest value in the response time management table 2142 (step S10).

The order-of-response-times changing unit 213 sorts the differences A-B for the respective volumes 110 in ascending order and stores the sorted result in the response time sorting table 2143 (step S11).

The communication control unit 212 transmits the information stored in the response time sorting table 2143 to the server 1 (step S12).

Figure 23:
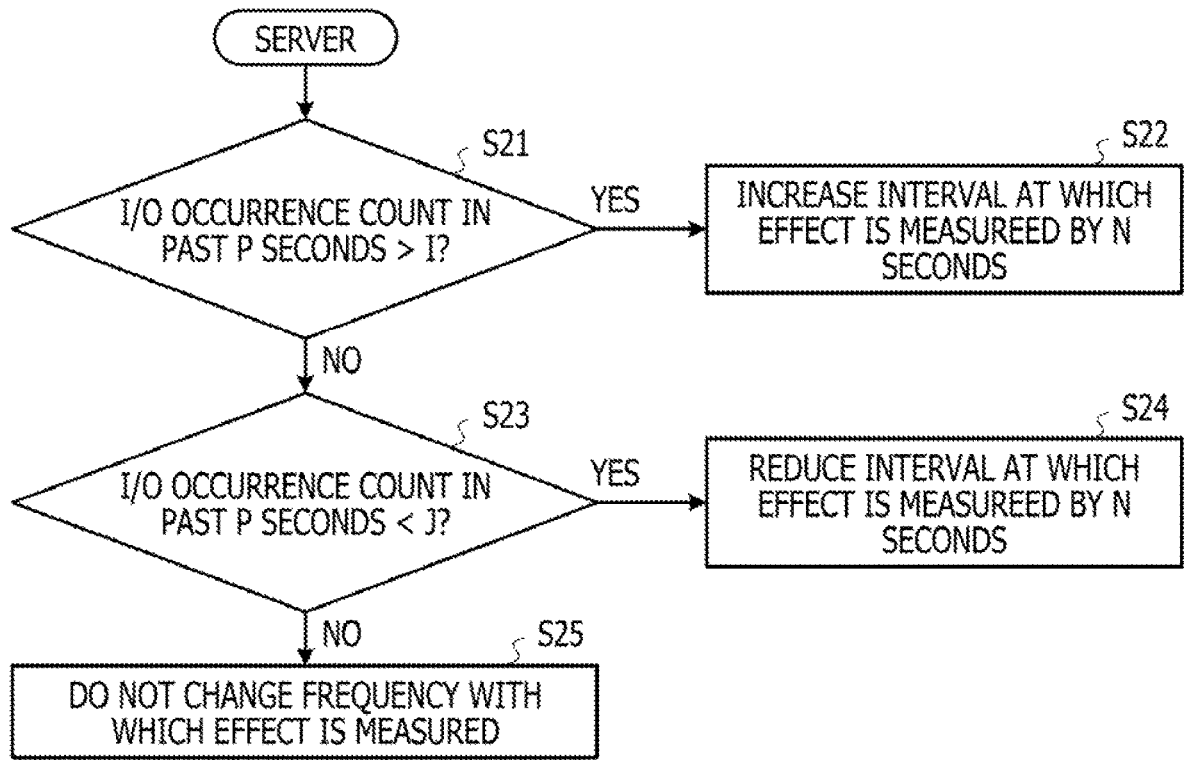
FIG. 23 is a flowchart for describing a cache-effect-measurement-frequency changing process performed in the server illustrated in FIG. 7.

A cache-effect-measurement-frequency changing process performed in the server 1 illustrated in FIG. 7 will be described next in accordance with a flowchart (step S21 to S25) illustrated in FIG. 23.

The I/O counting unit 114 determines whether the I/O occurrence count in past P seconds is greater than I (step S21).

If the I/O occurrence count in the past P seconds is greater than I (see a YES route in step S21), the I/O counting unit 114 increases, by N seconds, the interval at which the effect is measured (step S22).

On the other hand, if the I/O occurrence count in the past P seconds is not greater than I (see a NO route in step S21), the I/O counting unit 114 determines whether the occurrence count in the past P seconds is less than J (step S23).

If the I/O occurrence count in the past P seconds is less than J (see a YES route in step S23), the I/O counting unit 114 decreases, by N seconds, the interval at which the effect is measured (step S24).

On the other hand, if the I/O occurrence count in the past P seconds is not less than J (see a NO route in step S23), the I/O counting unit 114 does not change the frequency with which the effect is measured (step S25).

Figure 24B:
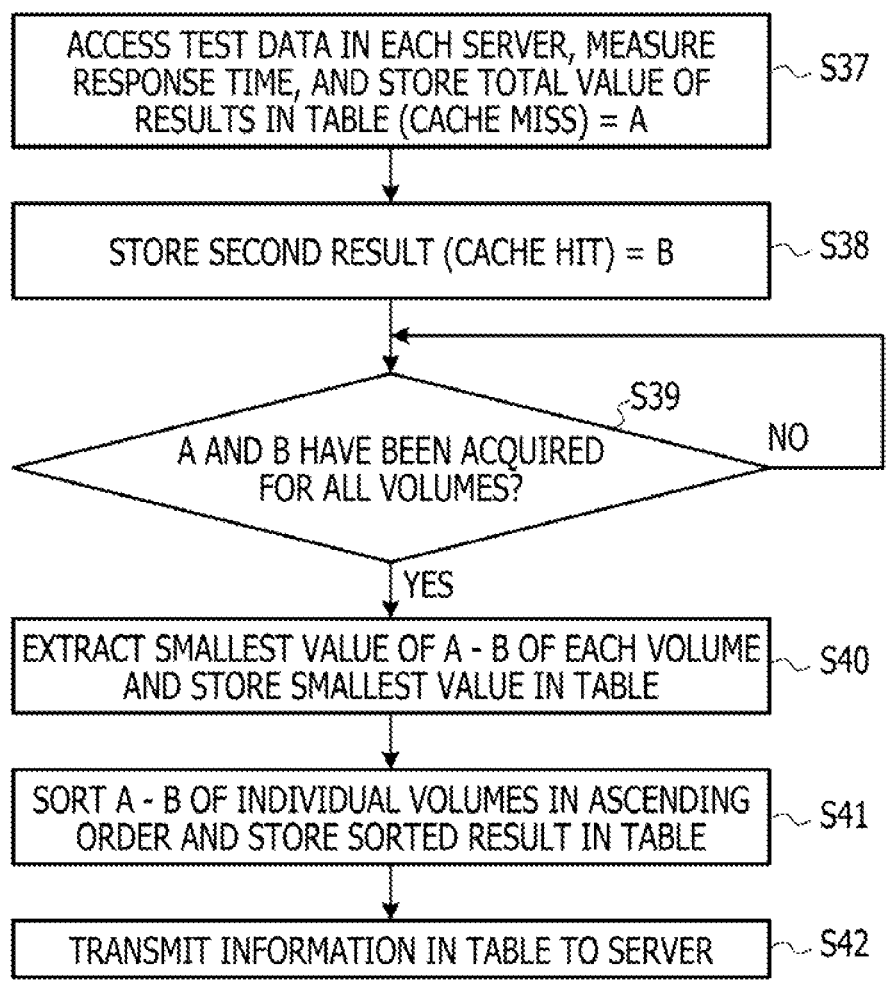

The response time measurement process, which is a modification example, performed in the information processing system 100 illustrated in FIG. 7 will be described with reference to a flowchart (step S31 to S42) illustrated in FIG. 24 (i.e., FIGS. 24A and 24B).

In the server 1, the test data creation unit 113 creates three pieces of test data (step S31).

The communication control unit 112 transmits an address of each piece of test data and the volume configuration information to the client node 2 (step S32).

The communication control unit 112 receives information stored in the response time sorting table 2143 from the client node 2 (step S33).

The cache capacity management unit 111 determines whether the total value of the response times is less than the threshold T (step S34).

If the total value of the response times is not less than the threshold T (see a NO route in step S34), the normal processing is performed (step S36).

On the other hand, if the total value of the response times is less than the threshold T (see a YES route in step S34), the cache capacity management unit 111 determines whether the rank of the volume 110 is less than or equal to L % of the total number (step S35). If the rank is not less than or equal to L % of the total number (see a NO route in step S35), the process proceeds to step S6.

On the other hand, if the rank is less than or equal to L % of the total number (see a YES route in step S35), the cache capacity of the volume 110 is reduced by M %.

In the client node 2, the response time measurement unit 211 accesses the test data in each of the servers 1 and measures a response time. The response time measurement unit 211 stores the total value of the results as the total value A for cache misses in the response time management table 2142 (step S37).

The response time measurement unit 211 stores the results for the second access as the total value B for cache hits (step S38).

The response time measurement unit 211 determines whether the total values A and B for all the volumes 110 are acquired (step S39).

If there is any volume 110 for which the total values A and B have not been acquired (see a NO route in step S39), the processing in step S39 is repeated.

On the other hand, if the total values A and B are acquired for all the volumes 110 (see a YES route in step S39), the response time measurement unit 211 extracts, for each of the volumes 110, the smallest value among differences A-B between the total values and stores the smallest value in the response time management table 2142 (step S40).

The order-of-response-times changing unit 213 sorts the differences A-B for the respective volumes 110 in ascending order and stores the sorted result in the response time sorting table 2143 (step S41).

The communication control unit 212 transmits the information stored in the response time sorting table 2143 to the server 1 (step S42).

[B-3] Effects

According to an information processing apparatus, a program, and an information processing method in one example of the embodiment described above, for example, the following operation effects may be provided.

The client node 2 measures response times for respective volumes in the servers 1. Each of the servers 1 reduces a capacity of an allocated cache memory in accordance with the response times.

This may improve the cache utilization efficiency of the entire system. For example, a limited cache capacity may be efficiently utilized by reducing a cache capacity of a volume having a stripe in the high-load server 1 and by allocating the cache capacity to a volume having a stripe in the low-load server 1 with a high cache hit rate. The access performance may be improved with the same memory usage without causing any performance degradation due to the reduction in cache capacity.

The server 1 reduces the capacity of the cache memory for the volume 110 for which a difference between the response time in a case of a cache miss and the response time in a case of a cache hit is smallest. Thus, the cache capacity may be reduced for the volume 110 for which a cache is less effective even if the volume 110 has the cache.

The server 1 reduces the capacity of the cache memory for a certain number of volumes 110 for which a difference between the response time in a case of a cache miss and the response time in a case of a cache hit is small. If an overloaded state continues in a certain server when the length of the response time is monitored, the cache capacity of the same volume is reduced every time a simulation is performed. Accordingly, the load of cache management may be reduced by reducing not only the cache capacity of the volume having the longest response time but also the cache capacity of the volume having the difference between the response times that is less than a predetermined value. By determining the upper limit on the number of volumes whose cache capacity is to be reduced, a situation in which the overall performance decreases because of a reduction in cache capacity of all the volumes may be avoided.

The server 1 increases, by a certain time, an interval at which the client node 2 measures the response time, in a case where an access count in a certain period exceeds a first threshold, and decreases, by the certain time, the interval at which the client node 2 measures the response time, in a case where the access count in the certain period is less than a second threshold. Thus, the frequency of the cache effect measurement may be made appropriate by changing the interval of the measurement of the response time in accordance with the I/O occurrence state (for example, the time when the I/O hardly occurs and the time when the I/O frequently occurs).

[C] Others

The disclosed technique is not limited to the above-described embodiment. The disclosed technique may be carried out by variously modifying the technique within a scope not departing from the gist of the present embodiment. Each of the configurations and each of the processes of the present embodiment may be selectively employed or omitted as desired or may be combined as appropriate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
an information processing apparatus; and
a terminal apparatus, wherein
the terminal apparatus includes
a first processor configured to measure response times for respective volumes in the information processing apparatus, and
the information processing apparatus includes
a second processor configured to reduce a capacity of an allocated cache memory in accordance with a difference between the response time in a case of a cache miss and the response time in a case of a cache hit.

2. The information processing system according to claim 1, wherein the second processor reduces the capacity of the cache memory for a volume for which a difference between the response time in a case of a cache miss and the response time in a case of a cache hit is smallest among the volumes.

3. The information processing system according to claim 1, wherein the second processor reduces the capacity of the cache memory for a certain number of volumes for which a difference between the response time in a case of a cache miss and the response time in a case of a cache hit is small among the volumes.

4. The information processing system according to claim 1, wherein the second processor increases, by a certain time, an interval at which the first processor measures the response times, in a case where an access count in a certain period exceeds a first threshold, and decreases, by the certain time, the interval at which the first processor measures the response times, in a case where the access count in the certain period is less than a second threshold.

5. An information processing method comprising:

measuring, with a terminal apparatus, response times for respective volumes in an information processing apparatus; and reducing, with the information processing apparatus, a capacity of an allocated cache memory in accordance with a difference between the response time in a case of a cache miss and the response time in a case of a cache hit.

* * * * *